Dec. 22, 1964  F. E. TUTTHILL  3,162,737
BREATHERLESS PRESSURE RESPONSIVE LIQUID LEVEL CONTROL
Filed April 16, 1962
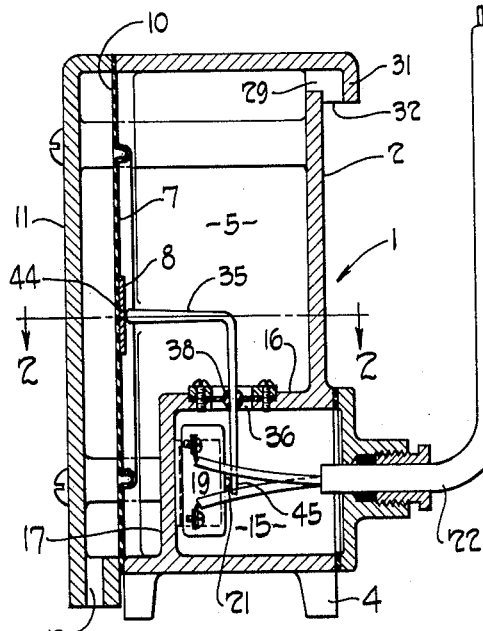
Fig. 1
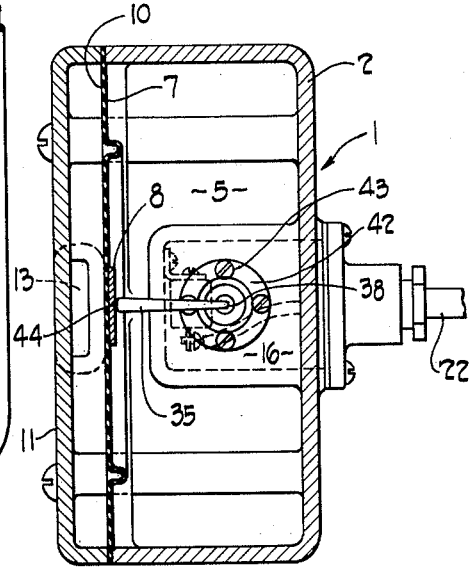
Fig. 2
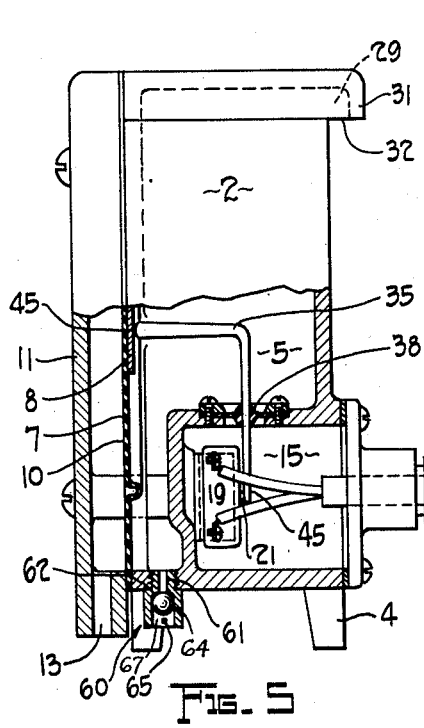
Fig. 5
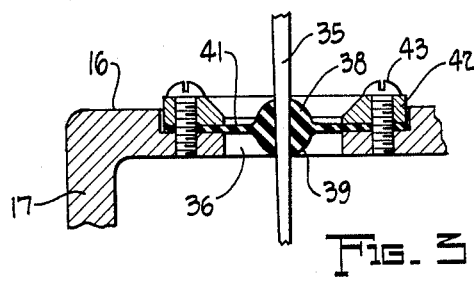
Fig. 3
Fig. 4
INVENTOR.
FRED E. TUTTHILL
BY Bosworth, Sessions,
Herrstrom & Knowles
ATTORNEYS.

United States Patent Office 3,162,737
Patented Dec. 22, 1964

3,162,737
BREATHERLESS PRESSURE RESPONSIVE LIQUID LEVEL CONTROL
Fred E. Tuthill, Grafton, Ohio, assignor to Kemco Pump Division of The American Crucible Products Company, Lorain, Ohio, a corporation of Ohio
Filed Apr. 16, 1962, Ser. No. 187,555
9 Claims. (Cl. 200—83)

This invention relates to pressure response controls and more particularly to controls adapted to respond to predetermined hydrostatic pressures to actuate submersible pumps and the like.

It is well known to provide submersible, electric motor driven sump and bilge pumps with controls which respond to a predetermined hydrostatic pressure to actuate the pump motor and pump and to pressure conditions and changes resulting from the operation of the pump to deactuate the motor and pump. Different embodiments of such pump controls have been proposed and developed including those which are housed within or attached to the submersible pump housing or are mounted on the discharge line closely adjacent the submersible pump.

Such controls have included a separate switch chamber, at least one wall of which comprised a pressure sensitive diaphragm. One side of the diaphragm is exposed to and acted upon the static pressure of the liquid to be pumped, and the other side of the diaphragm faces into the switch chamber and operates the switch. The switch and electrical connections are in the switch chamber and since such controls are usually submerged or partially submerged, even during normal operation, it is necessary that the switch chamber be maintained free of deleterious liquid, moisture and the like. At the same time, proper functioning of the diaphragm, without regard to the altitude of use or changing barometric conditions requires that the "at rest" or atmospheric pressure on both sides of the diaphragm be equalized so that the diaphragm is not displaced sooner (when the air pressure on the switch chamber side of the diaphragm is lower than that on the other side) or require a greater actuating pressure (when the air pressure on the switch chamber side is higher than that in the other side). Accordingly, it has been necessary to provide either means for loading the diaphragm to balance the at rest forces acting thereon or to provide communications between the switch chamber side of the diaphragm and the atmosphere, just as there is between the exposed side of the diaphragm and the atmosphere.

Communication between the switch chamber side and the atmosphere has been provided by means of breather tubes which have extended from the switch chamber and have opened at a point remote from the chamber and safely above any potential water or liquid level. Such tubes have frequently been included within the cable containing the electrical lead from the power source to the pump and control. Thus the breather tubes have provided a means for insuring that the pressure in the switch chamber remained at that of the surrounding atmosphere, no matter what the altitude and barometric condition of use, while at the same time protecting the switch from moisture, water and the like by preventing entry of the water or other liquid, in which the pump and control are submerged, into the switch chamber even if the depth thereof should reach heights above those normally anticipated.

The general object of this invention is to provide a new and improved pressure responsive control for submersible pumps and the like and, more particularly, to provide a new and improved pressure responsive control structure having a switch chamber which need not be vented.

Another object of this invention is to provide a new and improved pressure responsive control for submersible pumps and the like which is actuated by a pressure responsive diaphragm and which has a new and improved structure which provides a sealed switch chamber and means to equalize the air pressure on both sides of the diaphragm thereby obviating the need for breather tubes or other means providing communication between the switch chamber and the atmosphere.

Still other objects of this invention include the provision of a new and improved diaphragm actuated, pressure sensitive control for submersible pumps and the like which is effective in operation; which may be used at any altitude or under any barometric conditions without effecting the response of the diaphragm; which is not rendered inoperative by total submersion; and, which may be adapted for use and disposition within the pump housing, within a housing secured or mounted on the pump housing, or within a separate housing interconnected with the pump motor and power source by suitable electrical leads.

A further object of this invention is to provide a new and improved diaphragm operated, pressure sensitive control for submersible pumps and the like obtaining one or more of the objects and advantages set forth above.

These and other objects and advantages of this invention will appear from the following description of preferred and modified forms thereof, reference being had to the accompanying drawings in which:

FIGURE 1 is a vertical section of a control embodying a preferred form of this invention;

FIGURE 2 is a horizontal section of the control of FIGURE 1 viewed along the lines 2—2 of FIGURE 1;

FIGURE 3 is a broken section, on an enlarged scale of the pivot and sealing means of the control shown in FIGURE 1;

FIGURE 4 is a view, similar to FIGURE 3, showing another form of pivot and sealing means for a control embodying this invention; and FIGURE 5 is a broken vertical section showing another form of control embodying this invention.

This invention provides a control for use with submersible pumps and the like, which, on the one hand, fully protects and seals the electrical switch and the otherwise exposed wires and contacts therein from the effects of water, dampness, moisture and the like and against accidental inundation due to overflow of the sump, etc. when, for example, there is a power failure, and, on the other hand, provides means for equalizing the atmospheric pressure on both sides of the diaphragm while obviating the need for a breather tube extending from the switch chamber to the atmosphere safely outside of and removed from the sump, bilge or other control location.

The control embodying this invention is adapted to be disposed in the sump or other location at or adjacent the pump which is controlled thereby and will be described as disposed within its own separate housing for connection with the pump motor and power source by means of suitable electrical leads, albeit, it is to be understood that controls embodying this invention may be adapted for use in a separate housing, which is mounted on the pump housing, or within the pump housing itself.

A control embodying this invention is indicated generally at 1, FIGURE 1. Control 1 responds to the hydrostatic pressure of a first predetermined liquid level to actuate the pump, which it controls and to the reduced hydrostatic pressure of a second lower predetermined liquid level, resulting from operation of the pump, to deactuate the pump. Controls embodying this invention may also respond to other predetermined presures or pressure changes resulting from operation.

Control 1 comprises a housing 2, including suitable legs 4, upon which the control stands, and defining a chamber 5. Chamber 5 has an aperture in one wall which is covered and sealed by a pressure responsive diaphragm 7, having a reinforcing plate disc 8, secured thereto in a manner well known to the art. The outer face 10 of diaphragm 7 is covered by a bell or skirt 11 having a mouth 13 at its lower end through which the static pressure of the surrounding liquid is communicated to the diaphragm. Diaphragm 7 is protected against deleterious matter in the surrounding liquid by the air which is trapped within the skirt 11 when the liquid rises or is above the level of mouth 13. A separate chamber 15 is formed within housing 2, as by walls 16 and 17, for example.

A switch 19 having an operating button 21 is mounted within chamber 15. Switch 19 is a normally open microswitch of well known construction, which is adapted to respond to a first predetermined force, exerted on button 21, to close and then remains closed until the force exerted upon 21 is reduced to a predetermined level, less than that necessary to depress button 21, at which time button 21 extends and the switch opens.

A suitable power cord 22 extends through a conventional sealed connector to the pump motor and power source (not shown).

As will hereinafter more fully appear, switch chamber 15 is sealed to prevent moisture, water or dampness from entering. However, since chamber 15 is not exposed to the diaphragm and the switch button does not itself respond to air pressure, the air pressure within chamber 15 may vary over a wide range without effecting the operation of the control. This means that chamber 15 need not be vented and the pressure therein need not be the same as that exerted on the face of diaphragm 7.

On the other hand, the air pressure on the inner or switch chamber face of diaphragm 7 must be in equilibrium with that on the outer face 10 if the control is to operate properly and respond to the predetermined upper and lower liquid levels to actuate and deactuate the pump.

Accordingly, chamber 5 is provided with a vent 29 for maintaining communication with the atmosphere. Vent 29 is preferably disposed above the level at which diaphragm 7 responds to actuate switch 19 so that no liquid or pressure enters chamber 5 when the pump and control are operating normally.

In order to prevent liquid from entering chamber 5, should the switch fail to actuate when the liquid pressure reaches the predetermined level, as, for example, when there is a power failure in the power supply line, vent 29 is preferably provided with a skirt 31, having a mouth 32. Skirt 31 preferably has a relatively large volume to insure that the air trapped therein by rising liquid is sufficient to prevent the liquid from entering chamber 5, in the same manner air trapped in skirt 11 prevents the liquid from contacting face 10 of diaphragm 7. Mouth 32 of skirt 31 is sufficiently above mouth 13 of skirt 11 so that the pressure differential across diaphragm 7, when liquid rises above both mouths 13 and 32 exerts a force sufficient to depress button 21.

The response of diaphragm 7 to the static pressure of the liquid, as it increases, is transmitted to button 21, by means of lever arm 35 extending therebetween. Lever arm 35 enters chamber 15 through a suitable aperture 36 in the chamber wall.

Control 1 also includes means to prevent entry of moisture, liquid, etc. into the chamber 15 through the aperture and about the lever arm 35 while at the same time permitting the lever arm to have the movement necessary to transmit the motion and force of the diaphragm, as it responds to the hydrostatic pressure of the surrounding liquid, to the switch button. To this end lever arm 35 is preferably pivoted at or near the aperture 36 so as to minimize the amount of movement of the lever at the aperture.

Such sealing and pivoting means is best seen in FIGURE 3. It preferably comprises a mounting 38, of rubber or other suitable material, which is molded about or otherwise secured to lever arm 35. Mounting 38 has an enlarged bulbous center portion 39 through which the lever arm extends and a thin flexible flange portion 41 which is sealed to the wall of chamber 15, around the periphery of aperture 36, as by clamp 42. Aperture 36 is preferably circular and clamp 42 is an annulus which is fastened to the wall by suitable screws 43. The portion of flange 41 of mounting 38 which is within aperture 36 is loose and flexible enough to permit the lever arm to pivot on a transverse axis about mounting center 39.

The ends 44 and 45 of lever arm 35 engage diaphragm 7 and switch button 21, respectively, when the diaphragm and button are in their at rest positions. As pressure on the diaphragm increases, the force exerted thereby is transmitted through the lever arm to the switch button. When the force exerted on the button is sufficient to overcome the switch operating force, the diaphragm moves or displaces to pivot arm 35 and depress button 21 thereby closing the switch and actuating the motor and pump.

In operation the control is disposed in a sump or the like and the cord 22 is connected to the pump motor and power source. The atmospheric pressure on both sides of the diaphragm is equalized through skirts 11 and 31 and vent 29. As water or other liquid rises in the sump it engulfs the mouth 13 of skirt 11, trapping air therein and exerting a pressure on the diaphragm 7. This pressure creates a force which is transmitted, by the lever arm 35, into the sealed switch chamber 15 and against switch button 21. When the water level exerts sufficient hydrostatic pressure so that the force exerted on button 21 is sufficient to overcome the switch operating force and depress the button 21, diaphragm 7 displaces or flexes into chamber 5, lever 35 pivots about the axis in mounting 38 and the button 21 is depressed closing the circuit and actuating the pump motor. Operation of the pump evacuates the liquid until it is reduced to a level at which the force exerted through diaphragm 7 and lever 35 is no longer sufficient to hold button 21 depressed. The button then extends opening the circuit and deactuating the motor and lever 35 pivots, returning itself and the diaphragm to their at rest positions, and the control is ready for another cycle.

Should the pump fail to operate for any reason or should water collect at a faster rate than the pump can evacuate it, the skirt 31 prevents the water from entering chamber 5 through vent 29. However, even if water, moisture or dampness enter chamber 5, it will not effect the switch as the same is sealed therefrom in chamber 15 and if water enters chamber 5 it may be poured out through vent 29, so that future operation of the control will not be effected.

If desired housing 2 may be given an irregular shape, or fillers may be disposed within chamber 5 to reduce the volume of chamber 5 and make it easier for skirt 31 to prevent water from entering the chamber.

Another preferred form of means for sealing aperture 36 and pivotally supporting lever arm 35 is shown in FIGURE 4, wherein like reference characters refer to like parts as in FIGURES 1 and 2.

In FIGURE 4 the lever arm 35 is provided with a transversely extending pivot pin 50. Pin 50 is mounted in a suitable socket or seat 51 in the wall of chamber 15 and extends across the aperture 36 so that the lever 35 pivots about a transverse axis at the aperture. A separate flexible seal 53 has a sealing engagement with the lever as close as possible to the pivot pin 50. Seal 53 covers the aperture 36, holds pin 50 in its seat, and is held in position and in sealing engagement against the chamber wall and around the periphery of the aperture 36 in the same manner, for example, as flange 41 of mounting 38.

Another form of control embodying this invention is disclosed in FIGURE 5, wherein like reference characters refer to like parts as in FIGURE 1. The control of FIGURE 5 includes means whereby any liquid which might enter chamber 5, should unusual conditions permit the liquid level to rise until the pressure exerted thereby becomes sufficient to force liquid in through vent 29, is automatically evacuated from the chamber upon normal operation of the pump and control.

To this end chamber 5 is provided with a check valve, indicated generally at 60, at its lower end, but above the level to which the liquid is reduced by the operation of the pump, before the pump is deactuated by the control. Check valve 60 prevents liquid flow through the valve into the chamber 5 but permits flow, under the influence of gravity, from the chamber into the sump. As shown, valve 60 comprises an aperture 61 in housing 2, a seat 62, a floating check ball 64 and a pin 65 for retaining the ball 64 within float chamber 67. Ball 64 floats upwardly into sealing engagement with seat 62 when liquid rises in the sump and about the control and settles down upon pin 65 when the liquid is evacuated below the housing 2 thereby permitting any liquid which may have entered chamber 28 due to markedly abnormal situations to drain from the chamber.

Modifications, changes and improvements to the preferred and modified forms of the invention herein particularly disclosed and described may occur to those skilled in the art who come to understand the principles and precepts thereof. Accordingly, the scope of the patent issued hereon should not be limited to the specific forms of the invention herein particularly illustrated, disclosed and described but only consistent with the advance by which the invention has promoted the art.

I claim:

1. A breatherless pressure responsive control for submersible pumps and the like, said control comprising a housing defining a chamber, a pressure responsive diaphragm forming a part of one wall of said first chamber, a skirt overlying said diaphragm and having an open mouth for entrapping air and communicating the hydrostatic pressure at said mouth to said diaphragm, a second chamber within said housing, a normally open switch disposed in said second chamber and having an operating button, an aperture in the wall of said second chamber, a lever extending through said aperture and between said diaphragm and said switch button and transmitting force and motion between said diaphragm and switch button, a pivot for said lever at said aperture, means sealing said aperture about said lever, said diaphragm responding to the hydrostatic pressure of a predetermined first liquid to depress said button and close said switch, said switch opening when the pressure acting on said diaphragm is reduced to a predetermined amount less than the pressure necessary to have caused said response of said diaphragm, said second chamber being sealed, and a vent in said first chamber at least as high as said first predetermined liquid level.

2. A breatherless pressure responsive control for submersible pumps and the like, said control comprising a first chamber, a pressure responsive diaphragm forming a part of one wall of said first chamber, skirt means overlying said diaphragm and having an open mouth for entrapping air and communicating the hydrostatic pressure at said mouth to said diaphragm, said control also comprising a second chamber, said second chamber being sealed and having a wall, a switch disposed in said second chamber and having an operating button, an aperture in the wall of said second chamber, a lever extending through said aperture and between said diaphragm and said switch button and transmitting force and motion between said diaphragm and switch button, pivot and sealing means pivotally supporting said lever at said aperture and sealing said aperture about said lever at said pivot, said diaphragm responding to the hydrostatic pressure of a predetermined first liquid level to operate said lever to actuate said button and switch, said switch deactuating when the pressure acting on said diaphragm is reduced to a predetermined amount less than that necessary to have caused said response of said diaphragm, and a vent in said first chamber at least as high as said first predetermined liquid level.

3. The breatherless control according to claim 2 in which said pivot and sealing means comprises a thin, flat flexible disc covering said aperture and having an enlarged bulbous center portion through which said lever extends, said center portion having a sealing engagement with said lever.

4. The breatherless control according to claim 2 in which said pivot and sealing means comprises a pin extending through said lever at said aperture and pivotally supported in the wall of said second chamber at the edges of said aperture, and a flexible disc having sealing engagement with said lever adjacent said pin and covering said aperture.

5. The breatherless control according to claim 2 with means to drain liquid from said first chamber.

6. A breatherless pressure responsive control for submersible pumps and the like, said control comprising a first chamber, a pressure responsive diaphragm forming a part of one wall of said first chamber, means entrapping air and communicating the hydrostatic pressure of a predetermined liquid level to the side of said diaphragm external of said first chamber, said control also comprising a second chamber, said second chamber being sealed and having a wall, a switch disposed in said second chamber and having an operating button, lever means extending through said wall and between said diaphragm and said switch button and transmitting force and motion between said diaphragm and switch button, means pivotally supporting said lever means at said wall and sealing said wall about said lever means, said diaphragm responding to the hydrostatic pressure of a predetermined first liquid level to operate said lever means to actuate said button and switch, said switch deactuating when the pressure acting on said diaphragm is reduced to a predetermined amount less than that necessary to have caused said response of said diaphragm, means for venting said first chamber said vent means not admitting liquid into said first chamber when the liquid level is no higher than said first level, and means to drain liquid from said first chamber, said last named means comprising a valve disposed at the bottom of said first chamber above the level to which liquid is reduced when said switch is closed, said valve being closed when said lever actuates said switch and being open when said liquid is at said reduced level.

7. The breatherless control according to claim 6 in which said valve comprises a downwardly opening aperture in the wall of said first chamber, a housing having a hollow central portion surrounding said aperture, a float disposed in said housing and sealing said aperture when the liquid is above the level thereof, and means to retain said float in said housing, said last named means permitting said float to have limited vertical travel within said housing.

8. A breatherless pressure responsive control for submersible pumps and the like, said control comprising a first chamber, a pressure responsive diaphragm forming a part of one wall of said first chamber, skirt means overlying said diaphragm and having an open mouth for entrapping air and communicating the hydrostatic pressure at said mouth to said diaphragm, said control also comprising a second chamber, said second chamber being sealed and having a wall, a switch disposed in said second chamber and having an operating button, lever means extending through said wall and between said diaphragm and said switch button and transmitting force and motion between said diphragm and switch button, means pivotally supporting said lever means at said wall and sealing said wall about said lever means, said diaphragm responding to the hydrostatic pressure of a predetermined first liquid level to operate said lever means to actuate said button and switch, said switch deactuating when the pressure acting on said diaphragm is reduced to a predetermined amount less than that necessary to have caused said response of said diaphragm, and means for venting said first chamber, said vent means not admitting liquid into said chamber when liquid is no higher than said first predetermined liquid level.

9. A breatherless pressure responsive control for submersible pumps and the like, said control comprising a first chamber, a pressure responsive diaphragm forming a part of one wall of said first chamber, means entrapping air and communicating the hydrostatic pressure of a predetermined liquid level to the side of said diaphragm external of said first chamber, said control also comprising a second chamber, said second chamber being sealed and having a wall, a switch disposed in said second chamber and having an operating button, lever means extending through said wall and between said diaphragm and said switch button and transmitting force and motion between said diaphragm and switch button, means pivotally supporting said lever means at said wall and sealing said wall about said lever means, said diaphragm responding to the hydrostatic pressure of a predetermined first liquid level to operate said lever means to actuate said button and switch, said switch deactuating when the pressure acting on said diaphragm is reduced to a predetermined amount less than that necessary to have caused said response to said diaphragm, and means for venting said first chamber, said vent means not admitting liquid into said chamber when liquid is no higher than said first predetermined liquid level.

References Cited in the file of this patent
UNITED STATES PATENTS

| | | |
|---|---|---|
| 2,305,154 | Gilbert | Dec. 15, 1942 |
| 2,890,305 | Gutkowski | June 9, 1959 |
| 3,056,004 | Davis | Sept. 25, 1962 |